(12) United States Patent
Niki et al.

(10) Patent No.: US 6,404,084 B1
(45) Date of Patent: Jun. 11, 2002

(54) GEARED ELECTRIC MOTOR WITH ROTATION SENSOR

(75) Inventors: Kenichi Niki; Nobuo Yoshioka, both of Yokohama (JP)

(73) Assignee: Jidosha Denki Kogyo Kabushiki Kaisha, Kanagawa-Prefecture (JP)

( * ) Notice: Subject to any disclaimer, the term of this patent is extended or adjusted under 35 U.S.C. 154(b) by 0 days.

(21) Appl. No.: 09/652,787

(22) Filed: Aug. 31, 2000

(30) Foreign Application Priority Data

Aug. 31, 1999 (JP) ............................................ 11-245056

(51) Int. Cl.$^7$ ............................ H02K 7/00; B60J 1/160
(52) U.S. Cl. ...................... 310/75 R; 310/68 B; 310/83; 74/89.14; 74/425
(58) Field of Search ............................ 310/75 R, 68 B, 310/83; 74/89.14, 425

(56) References Cited

U.S. PATENT DOCUMENTS

| | | | | |
|---|---|---|---|---|
| 5,172,884 A | * | 12/1992 | Ishiyama | 248/479 |
| 5,500,564 A | * | 3/1996 | Sano et al. | 310/83 |
| 5,875,681 A | * | 3/1999 | Gerrand et al. | 74/427 |
| 5,979,256 A | * | 11/1999 | Kilker et al. | 74/89.16 |
| 6,028,384 A | * | 2/2000 | Billman et al. | 310/83 |
| 6,162,142 A | * | 12/2000 | Hori et al. | 475/149 |

* cited by examiner

Primary Examiner—Burton S. Mullins
(74) Attorney, Agent, or Firm—Sughrue Mion, PLLC

(57) ABSTRACT

A geared electric motor for driving, for example, a window glass or a sunroof lid of the motor vehicle, which is provided with a armature shaft, reduction gears for reducing rotational speed of the armature shaft, an output shaft connected with the final section of the reduction gears through a damper, speed increasing gears connected with the output shaft, a rotor connected with the final section of the speed increasing gears, and a rotation sensor for generating a signal according to rotation of the rotor.

10 Claims, 5 Drawing Sheets

GEARED ELECTRIC MOTOR WITH ROTATION SENSOR

BACKGROUND OF THE INVENTION

1. Field of the Invention

This invention relates to a geared electric motor provided with a rotation sensor for detecting rotation of the output shaft, which is used for driving, for example a window glass of a power window apparatus, a sunroof lid of a sunroof apparatus of motor vehicles or so.

2. Description of the Prior Art

As a geared electric motor with a rotation sensor for detecting the rotation of the motor shaft, a motor has been known, which is provided with a magnet secured to the armature shaft to be rotated according to power supply and a signal generating element disposed around about the magnet as disclosed in U.S. Pat. No. 5, 245,258.

In the power window apparatus or the sunroof apparatus incorporated with the electric motor of this kind, if an obstruction is caught between the window glass and the sash or he sunroof lid and the frame while the window glass or the sunroof lid is traveling in the closing direction, the armature shaft of the electric motor loses in rotational speed and the number of rotation signals generated from the signal generating element is reduced remarkably. The obstruction is detected to be caught according to the reduction in number of rotations of the armature shaft by the control circuit of the apparatus, and the obstruction is released before long by actuating the armature shaft of the electric motor in the reverse direction and driving the window glass or the sunroof lid in the opening direction.

In the aforementioned electric motor with the rotation sensor, the movement of the window glass or the sunroof lid is detected on basis of the rotation of the armature shaft of the motor, however the window glass or the sunroof lid is not combined directly with the armature shaft of the motor, but is connected with the output shaft through reduction gears composed of a worm formed on the armature shaft and a worm wheel meshed with the worm, and a rubber-made damper housed in the worm wheel. Therefore, when the obstruction is caught by the window glass or the sunroof lid, the reduction of the traveling speed of the window glass or the sunroof lid caused by the obstruction is transmitted to the armature shaft through the reduction gears including the rubber-made damper after plastic deformation of the damper and the reduction in the number of rotations of the armature shaft becomes smaller at the beginning of pinching of the obstruction. Accordingly, it takes a time for detecting the obstruction to be caught by the window glass or the sunroof lid and there is a problem in that there is the possibility of causing a time lag in the control for driving the window glass or the sunroof lid in the reverse direction.

SUMMARY OF THE INVENTION

This invention is made in view of the aforementioned problems of the prior art, and it is an object to provide a geared electric motor having a rotation sensor which is possible to improve the accuracy in detection of the rotation of the output shaft in the electric motor.

The geared electric motor according to this invention is characterized by comprising an armature shaft to be rotated according to introduction of electric current, reduction gears connected with the armature shaft for reducing rotational speed of the armature shaft, a damper combined with a final section of the reduction gears, an output shaft combined with load and the damper, speed increasing gears connected with the output shaft, a rotor connected with a final section of the speed increasing gears, and a rotation sensor for generating a signal according to rotation of the rotor.

In the geared electric motor according to this invention, the rotation of the armature shaft is given to the output shaft through the damper after reducing the rotational speed of the armature shaft by the reduction gears. The rotation sensor generates signals (rotation signal) in response to the rotation of the rotor which is rotated in the speed increasingly transmitted from the output shaft through the speed increasing gears. Accordingly, the rotation signal is generated accurately by the rotation sensor according to the rotation of the output shaft of the motor without influence of the plastic deformation of the damper and the scattering in the magnetizing.

DESCRIPTION OF PREFERRED EMBODIMENT

Figure 1:
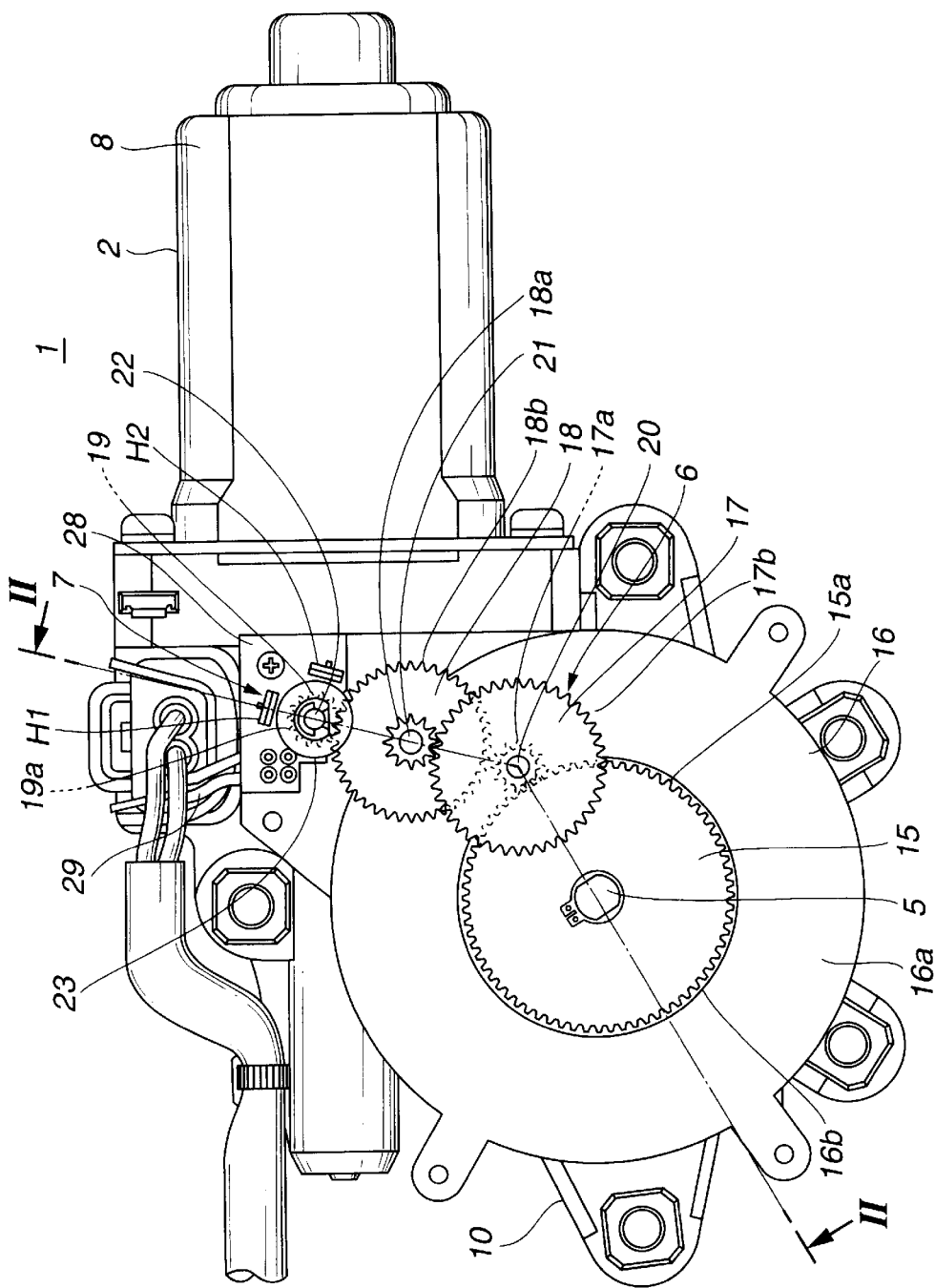
FIG. 1 is a front view of a geared electric motor according to an embodiment of this invention.
Figure 2:
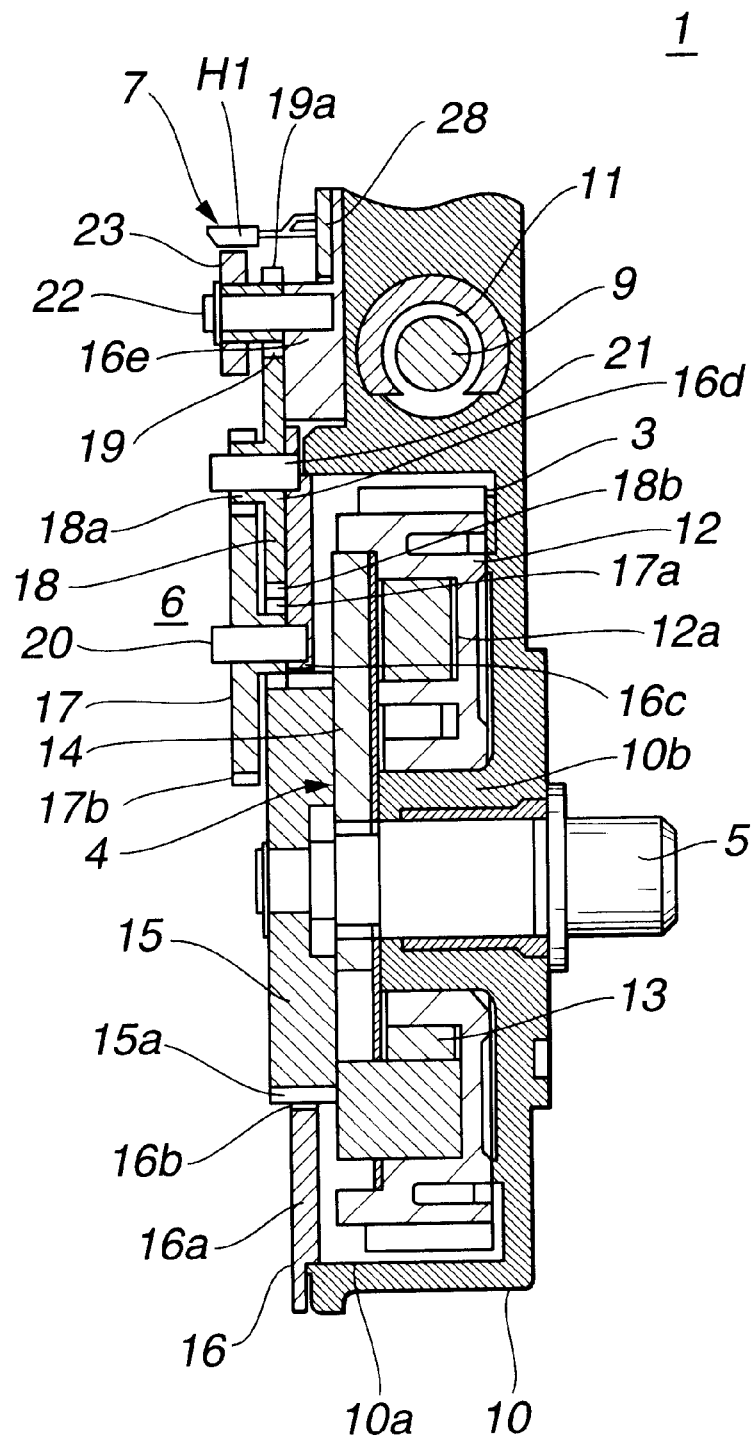
FIG. 2 is a cross-sectional view along section lines II—II of FIG. 1.

A geared electric motor according to an embodiment of this invention will be described below on basis of FIG. 1 to FIG. 6. In this example, the geared electric motor according to this invention is applied to a power window apparatus 50 as shown in FIG. 6.

The geared electric motor 1 is mainly composed of a motor body 2, reduction gears 3, transmission 4, an output shaft 5, speed increasing gears 6 and a rotation sensor 7.

In the motor body 2, a pair of motor magnets (not shown) is disposed in a motor yoke 8, and an armature (not shown) is disposed on the inside of the motor magnets so as not to be out of contact with the magnets. An armature shaft 9 of the armature is rotatably supported by the motor yoke 8 and a gear case 10. The armature is so designed as to be rotated in the forward direction according to the introduction of electric current to the armature coil through a pair of brushed (not shown) in a predetermined direction, and to be rotated in the reverse direction according to the introduction of electric current in the opposite direction. The armature shaft 9 of the motor body 2 is disposed protrudingly into the gear case 10 and formed with a worm 11 forming a part of the reduction gears 3 in the protruding portion in the gear case 10. The worm 11 is meshed with a worm wheel 12 forming the other part of the reduction gears 3.

The reduction gears 3 is composed of the worm 11 of the armature shaft 9 and the worm wheel 12 as mentioned above, and they are contained in the reduction gear housing 10a formed in the gear case 10.

The worm wheel 12 is supported rotatably on the outside of an output shaft support 10b formed in the near center of the gear case 10. The worm wheel 12 is formed with a damper-fitting recess 12a having a hollow annular shape.

In the reduction gears 3, the reduction ratio of the rotational frequency of the armature shaft 9 to that of the worm wheel 12 is 70:1.

The transmission 4 is composed of a damper 13 and a hub 14.

The damper 13 is made of rubber into an annular plate-like shape and combined with the worm wheel 12 in united one body by putting into the damper-fitting recess 12a of the worm wheel 12.

The hub 14, which is a metallic plate, is secured to the damper 13 at the outer periphery and combined with the output shaft 5 at the center thereof. The hub 14 has a function for preventing the damper 13 to come out from the damper-fitting recess 12a of the worm wheel 12.

The output shaft 5 is rotatably supported on the inside of the output shaft support 10b of the gear case 10 and combined with the hub 14 at the position near to the top end thereof. The output shaft 5 is further combined with a first gear 15, which forms a part of the speed increasing gears 6, at the top end coaxially, and combined with a drum 41 of a window glass regulator 40 shown in FIG. 6 at the base end protruding on the outside of the gear case 10.

The gear case 10 is secured with a gear base 16 so as to cover the reduction gear housing 10a, and the speed increasing gears 6 is disposed on the gear base 16.

The speed increasing gears 6 is composed of the aforementioned first gear 15, a second gear 17, a third gear 18 and a rotor-gear 19.

The gear base 16 is formed with a recess 16b to be contained with the first gear 15 in the center of a disc shaped base body 16a and further formed with a first axle holder 16c, a second axle holder 16d and a rotor support 16e at respective positions away from each other.

A first axle 20 is secured in the first axle holder 16c of the gear base 16 in parallel to the output shaft 5, a second axle 21 is secured in the second axle holder 16d in parallel to the first axle 20 and a rotor axle (third axle) 22 is secured in the rotor support 16e in parallel to the second axle 21.

The first gear 15 is combined coaxially with the output shaft 5 as mentioned above. The first gear 15 is a spur gear provided with teeth 15a. The number of teeth 15a is 70.

The second gear 17 is rotatably supported by the first axle 20 and composed of a small gear 17a which is a spur gear with a small diameter and a large gear 17b which is also a spur gear with a large diameter and united with the small gear 17a. The teeth 15a of the first gear 15 are meshed with the small gear 17a of the second gear 17. The number of teeth of the small gear 17a is 12 and the number of teeth of the large gear 17b is 45.

The third gear 18 is rotatably supported by the second axle 21, the third gear 18 is composed of a small gear 18a which is a spur gear with a small diameter and a large gear 18b which is also a spur gear with a large diameter and united with the small gear 18a. The large gear 17b of the second gear 17 is meshed with the small gear 18a of the third gear 18. The number of teeth of the small gear 18a is 12, and the number of teeth of the large gear 18b is 40.

The rotor-gear 19 is rotatably supported by the rotor axle 22, the rotor-gear 19 is a spur gear provided with teeth 19a. The large gear 18b of the third gear 18 is meshed with the teeth 19a of the rotor-gear 19. The rotor-gear 19 is united in one body with a rotor 23 forming a part of the rotation sensor 7. The number of the teeth 19a of the rotor-gear 19 is 12.

In the speed increasing gear 6, the rotation of the output shaft 5 is increased through the teeth 15a of the first gear 15 and the small gear 17a of the second gear 17, and increased through the large gear 17b of the second gear 17 and the small gear 18a of the third gear 18, and further increased through the large gear 18b of the third gear 18 and the rotor-gear 19. The speed increasing ratio of the rotational frequency of the output shaft 5 to that of the rotor-gear 19 in the speed increasing gears 6 is 1:72.9.

The rotation sensor 7 is composed of the rotor 23, a magnet having magnetic poles 24 and 25, a first signal generating element H1 and a second signal generating element H2.

The rotor 23 is formed in a ring shape from non-magnetic materials and rotatably supported by the rotor axle 22 together with the rotor-gear 19.

Figure 3:
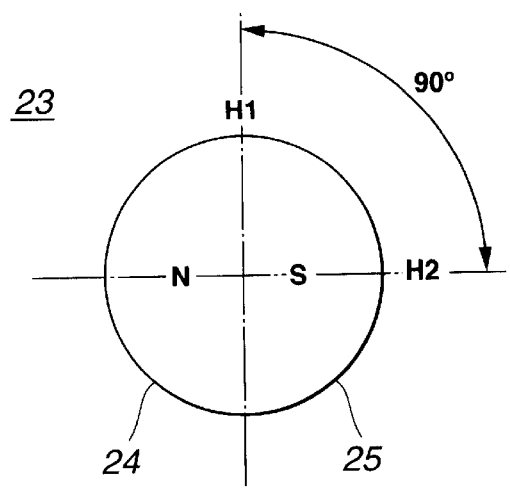
FIG. 3 is a front view of a rotor of the geared electric motor shown in FIG. 1.

The magnetic poles 24 and 25 of the magnet are magnetized on the outer peripheral part of the rotor 23 in a range of 180 degrees, respectively as shown in FIG. 3. The magnetic poles 24 and 25 are rotated together with the rotor 23.

Each of the first and second signal generating elements H1 and H2 is a Hall IC and secured on a sensor base 28 screwed to the gear case 10 independently from the gear base 16. The elements H1 and H2 are disposed on the outside of the rotor axle 22 with a space of 90 degrees so as not to be out of contact with the magnet poles 24 and 25 of the magnet. The respective lead wires of the first and second signal generating elements H1 and H2 are electrically connected with the power window control circuit through an external wiring 29.

Figure 4:
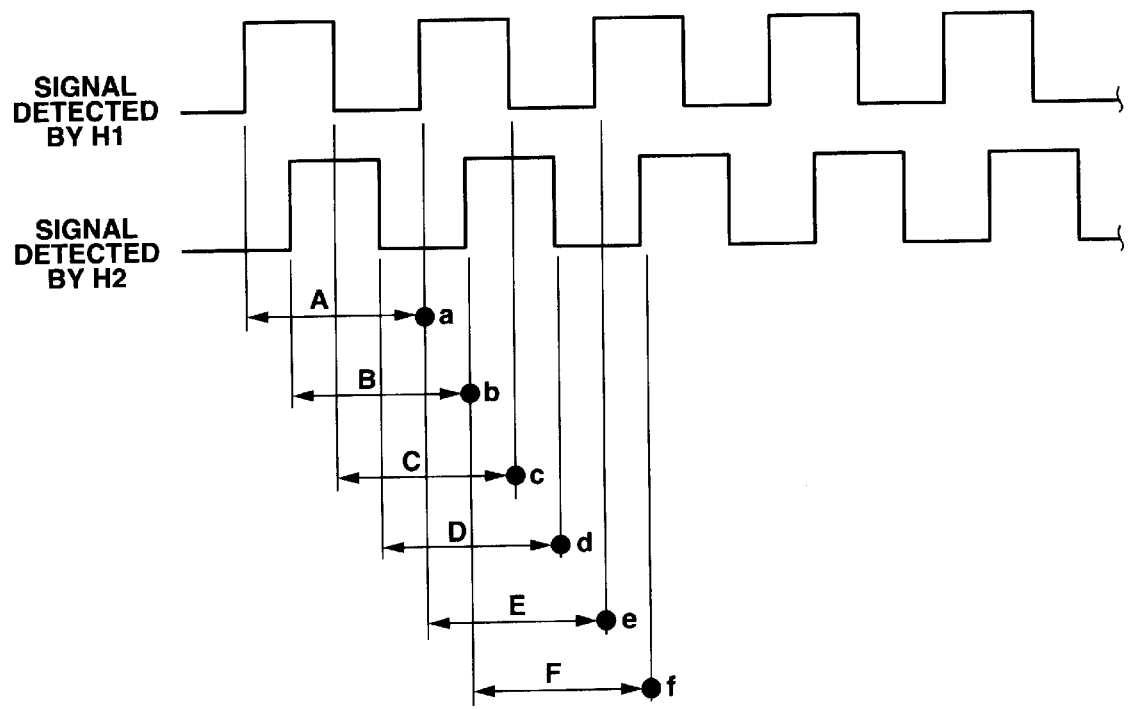
FIG. 4 is a wave form chart of the rotation signal generated from a rotation sensor of the geared electric motor shown in FIG. 1.

The first and second signal generating elements H1 and H2 generate pulse signals (rotation signal) having phase difference of a ¼ cycle, respectively according to the rotation of the rotor 23 as shown in FIG. 4.

In the geared electric motor 1, the first and second signal generating elements H1 and H2 generate the rotation signals in response to the rotation of the rotor 23 transmitted from the output shaft 5 so as to increase the rotational frequency through the speed increasing gears 6, therefore the rotation of the output shaft 5 is detected directly without influence of the elastic deformation of the damper 13.

The geared electric motor 1 having the aforementioned construction is mounted on the vehicle body and incorporated in the power window apparatus 50 as shown in FIG. 6. That is, the output shaft 5 of the motor 1 is combined with the drum 41 of the window glass regulator 40 in the power window apparatus 50, the gear case 10 is screwed on the door panel of the vehicle body, the brushes and the external wiring 29 are connected electrically with the power window control circuit. The window glass regulator 40 is provided with a wire 42 wound around the drum 41, a guide 43 fixed on the door panel and passed through with the wire 42 and a fixing member 45 for fixing a part of the wire 42 with the window glass 44.

The power window control circuit is provided with a position and direction-detecting circuit, a lock-detecting circuit and a inversion control circuit, and further equipped with an open-switch for actuating the window glass 44 in the opening direction, a close-switch for actuating the window glass 44 in the closing direction and an auto-switch for maintaining the window glass 44 to move in the opening or closing direction even after removing a finger from the open or close-switch.

The position and direction-detecting circuit is a counter connected with the rotation sensor 7 through the external wiring 29, and detects the position and the traveling direction of the window glass indirectly on basis of the number of pulses in the rotation signal given by the rotation sensor 7. That is, the minimum value "0" is counted when the window glass 44 is in the full-closed position A and the maximum value "N" is counted when the window glass 44 is in the full-opened position B. The counting value increases when the window glass 44 travels toward the full-opened position B form the full-closed position A, and the counting value decreases when the window glass 44 travels toward the full-closed position A from the full-opened position B. In the position and direction-detecting circuit, the range between the full-closed position A and the position C near to the full-closed position A of the window glass 44, that is the counting value range from "0" up to "X" is defined as the non-reversing region Z. Namely, when the window glass 44 is in this region Z between the positions A and C, the reversing control of the window glass 44 in not performed even if the motor 1 is detected to be locked by the lock-detecting circuit.

The lock-detecting circuit is connected with the rotation sensor 7 through the external wiring 29, measures one cycle (A, B, C. . . ) of the respective pulse signals (rotation signals) generated from the first and second signal generating elements H1 and H2 and compares the measured-present datum with the four times earlier datum at every ¼ cycle (a, b, c. . . ) of the rotation signals as shown in FIG. 4. The lock-detecting circuit generates a lock signal when the difference obtained by comparing the present datum with the four times earlier datum of one cycle of the pulse signal exceeds the predetermined reference value. The lock signal is generated at the time when the window glass 44 arrives in the full-closed position A or the full-opened position B, and when the obstruction is caught by the window glass 44.

The inversion control circuit drives the window glass 44 reversely toward the full-opened position B by reversing the direction of the current supply to the motor 1 if the obstruction is caught by the window glass 44 and the lock signal is given from the lock-detecting circuit in the case where the counting value in the position and direction-detecting circuit is decreasing and the counting value is detected to be in the range of "X" to "N", that is the window glass 44 is detected to travel toward the position C near to the full-closed position A from the full-opened position B.

In the power window control circuit, the current supply to the motor 1 is interrupted according to the lock signal given from the lock-detecting circuit, thereby stopping the window glass 44 at the time when the counting value in the position and direction-detecting circuit is "0", that is the window glass 44 arrives in the full-closed position A, and when the counting value is "N", that is the window glass 44 arrives in the full-opened position B.

When the open-switch in the power window control circuit is switched on in a case of closing the window glass 44, the armature shaft 9 of the motor 1 makes rotation in the forward direction according to current supply to the armature in the forward direction, and the output shaft 5 is rotated in the forward direction by transmitting the rotational force of the armature shaft 9 through the worm wheel 12, the damper 13 and the hub 14.

The drum 41 of the window glass regulator 40 is rotated in the forward direction together with the output shaft 5, and the wire 42 moves downwardly in FIG. 6 along the guide 43 according to the forward rotation of the drum 41, thereby driving the window glass 44 secured with the wire 42 by the fixing member 45 toward the full-opened position B.

According to the forward rotation of the output shaft 5, the pulse signals (rotation signal) are generated from the rotation sensor 7 whereby the counting value of the position and direction-detecting circuit increases.

When the window glass 44 arrives in the full-opened position B according to continuous on-operation of the open-switch, the window glass 44 is restricted to move by the vehicle body at the full-opened position B and the rotation of the output shaft 5 is also restricted. Accordingly, the difference data obtained from the alteration of one cycle of the pulse signal generated from the rotation sensor 7 becomes larger than predetermined reference value, whereby the lock-detecting circuit generates the lock signal. In response to the lock signal, the power window control circuit stops the window glass 44 at the full-opened position B by interrupting the current supply to the electric motor 1.

If the close-switch is switched on together with the auto-switch provided to the power window control circuit in the case of opening the window glass 44, the armature shaft 9 makes rotation in the reverse direction according to current supply to the armature of the motor 1 in the opposite direction, and the output shaft 5 is rotated in the reverse direction by transmitting the reverse rotation of the armature shaft 9 through the worm wheel 12, the damper 13 and the hub 14.

The drum 41 of the window glass regulator 40 is rotated in the reverse direction together with the output shaft 5 of the motor 1, and the wire 42 moves upwardly in FIG. 6 along the guide 43 together with the window glass 44 secured to the wire 42 according to the reverse rotation of the drum, thereby driving the window glass 44 toward the full-closed position A.

The pulse signals (rotation signal) are generated from the rotation sensor 7 according to the reverse rotation of the output shaft 5, whereby the counting value of the position and direction-detecting circuit decreases.

In this time, the auto-switch is switched on together with the close-switch, so that the closing command signal generated from the close-switch is maintained even after releasing the close-switch, and the output shaft 5 continues to rotate in the reverse direction, thereby driving the window glass 44 toward the full-closed position A.

Figure 5:
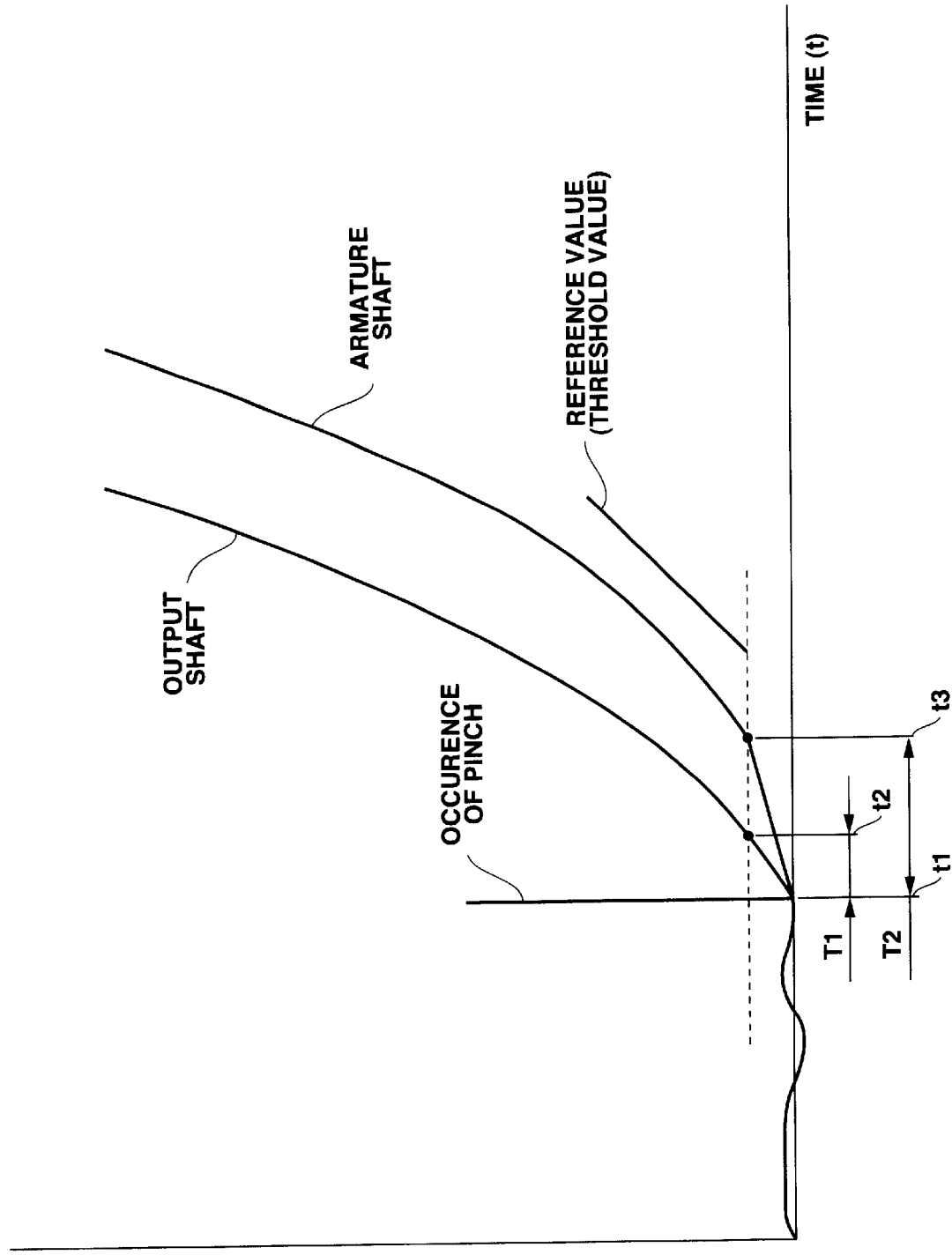
FIG. 5 is a graph illustrating time required for detecting the obstruction to be caught by the window glass in the power window apparatus incorporated with the geared electric motor shown in FIG. 1.
Figure 6:
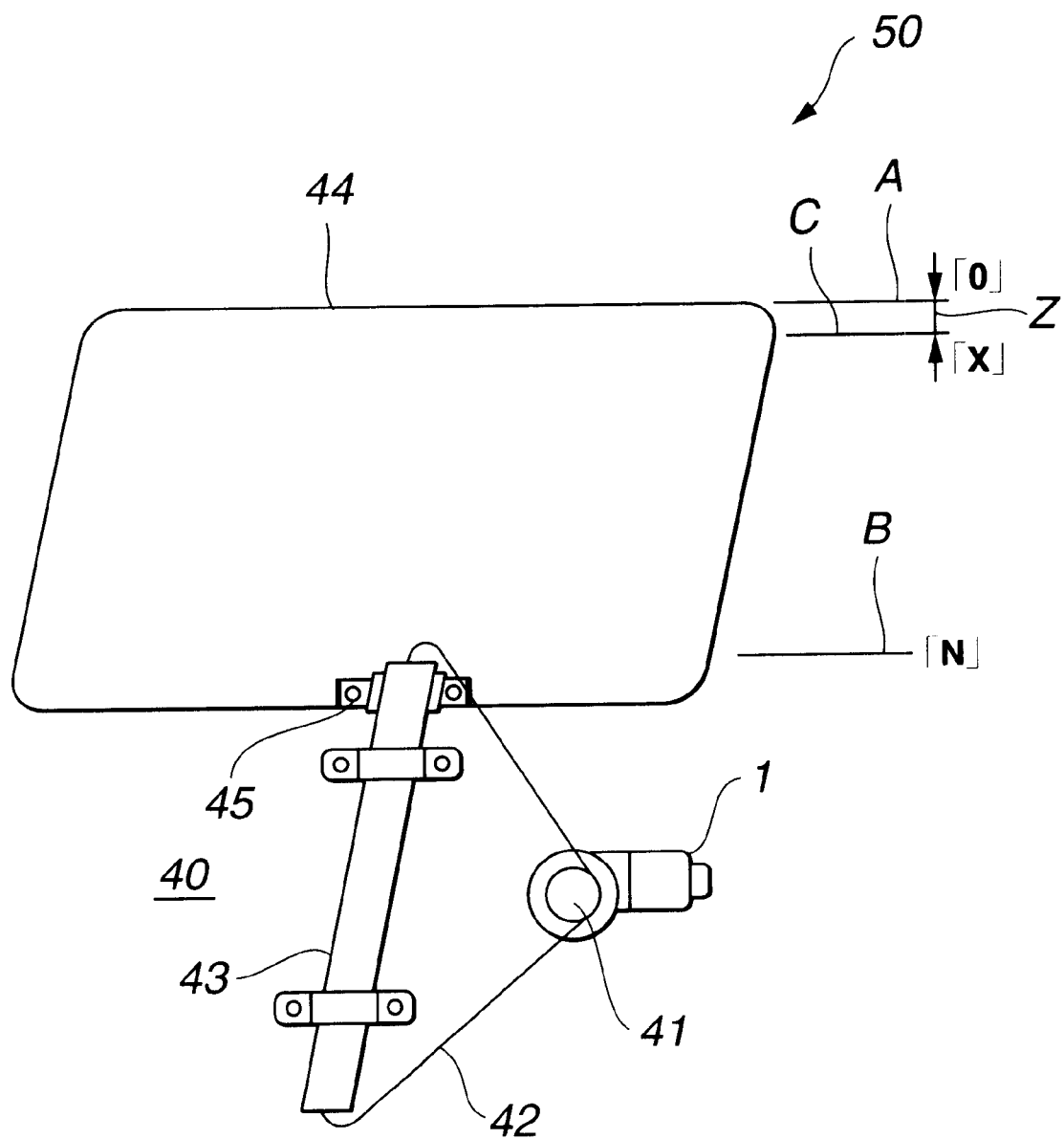
FIG. 6 is a schematic representation illustrating the power window apparatus incorporated with the geared electric motor shown in FIG. 1.

If the obstruction is caught between the window glass 44 and the vehicle body at time t1 shown in FIG. 5 while the window glass 44 is traveling between the full-opened position B and the position C near to the full-closed position A, the difference data obtained from the alteration of one cycle of the pulse signal (rotation signal) generated from the rotation sensor 7 exceeds the predetermined reference value, whereby the lock signal is generated from the lock-detecting circuit at time t2 shown in FIG. 5. The counting value of the position and direction-detecting circuit is in the range of from "X" up to "N" and decreasing in this time, therefore the lock signal is supplied to the inversion control circuit of the power window control circuit from the lock-detecting circuit, and the inversion control circuit drives the window glass 44 in the opposite direction toward the full-opened position B by inverting the direction of current supply to the armature of the electric motor 1 in response to the lock signal, thereby releasing the obstruction from the window glass 44 and the vehicle body.

In this time, the time required for recognizing the occurrence of pinching of the obstruction by the power window control circuit after the obstruction is actually caught (pinched) by the window glass 44 at time t1 is a time period T1 (from time t1 to time t2) as shown in FIG. 5. As compared with above, in the conventional geared motor so designed as to detect the rotation of the armature shaft, it takes a time period T2 (from time t1 to time t3) for recognizing the occurrence of pinching because the time required for the plastic deformation of the damper is included for the detection. Accordingly, in the power window control circuit incorporated with the geared electric motor 1 having the rotation sensor 7 for directly detecting the rotation of the output shaft 5, it is possible to recognize the occurrence of pinching of the obstruction in extremely short time as compared with the circuit incorporated with the conventional electric motor.

As mentioned above, in the geared electric motor according to this invention, the rotation of the armature shaft is reduced in the rotational frequency by the reduction gears, and given to the output shaft through the damper. The rotation of the output shaft is increased in the rotational frequency through the speed increasing gears and transmitted to the rotor disposed with the magnet, for example, and the rotation sensor generates a signal according to the rotation of the rotor. Therefore, it is possible to detect the rotation of the output shaft directly without influence of the plastic deformation of the damper and influence of the scattering in the magnetizing by reducing the number of magnetic poles, and an excellent effect can be obtained in that it is possible to detect the rotation of the output shaft very accurately and possible to detect the position, the traveling speed and direction of the window glass or the sunroof lid very correctly, and improve the accuracy in the detection of pinched obstruction.

What is claimed is:

1. A geared electric motor comprising:
   an armature adapted to be rotated upon introduction of electric current to an armature coil;
   reduction gears connected to an armature shaft of said armature for reducing rotational speed of said armature shaft;
   a damper combined with a final section of said reduction gears;
   an output shaft combined with said damper;
   rotational speed increasing gears connected with said output shaft;
   a rotor connected with a final section of said rotational speed increasing gears; and
   a rotation sensor for generating a signal according to rotation of said rotor, wherein the product of the reduction ratio of said reduction gears and the speed increasing ratio of said rotational speed increasing gears is approximately 1.

2. A geared electric motor as set forth in claim 1, wherein said rotation sensor comprises of a magnet disposed on said rotor and a signal generating element disposed outwardly of said magnet on the rotor so as not to contact said magnet.

3. A geared electric motor as set forth in claim 1, wherein said reduction gears comprises a worm provided on the armature shaft and a worm wheel meshed with said worm, and said rotational speed increasing gears comprise a first gear combined with said output shaft, a second gear meshed with said first gear, a third gear meshed with said second gear, and a rotor gear combined with said rotor and meshed with said third gear.

4. A geared electric motor as set forth in claim 3, wherein said rotation sensor comprises a magnet disposed on said rotor and a signal generating element disposed outwardly of said magnet on the rotor so as not to contact said magnet.

5. A geared electric motor as set forth in claim 3, wherein said worm wheel is housed in a gear case and the gear case is provided with a first axle for rotatably supporting said second gear, a second axle for rotatably supporting said third gear and a third axle for rotatably supporting said rotor gear, and said first, second and third axles are disposed in parallel to said output shaft.

6. A geared electric motor as set forth in claim 5, wherein said rotation sensor comprises a magnet disposed on said rotor and a signal generating element disposed outwardly of said magnet on the rotor so as not to contact said magnet.

7. A geared electric motor comprising:
   an armature adapted to be rotated upon introduction of electric current to an armature coil;
   reduction gears connected to an armature shaft of said armature for reducing rotational speed of said armature shaft;
   a damper combined with a final section of said reduction gears;
   an output shaft combined with said damper;
   rotational speed increasing gears connected with said output shaft;
   a rotor connected with a final section of said rotational speed increasing gears; and
   a rotation sensor for generating a signal according to rotation of said rotor, wherein said reduction gears comprises a worm provided on the armature shaft and a worm wheel meshed with said worm, and said rotational speed increasing gears comprise a first gear combined with said output shaft, a second gear meshed with said first gear, a third gear meshed with said second gear, and a rotor gear combined with said rotor and meshed with said third gear.

8. A geared electric motor as set forth in claim 7, wherein said rotation sensor comprises a magnet disposed on said rotor and a signal generating element disposed outwardly of said magnet on the rotor so as not to contact said magnet.

9. A geared electric motor as set forth in claim 7, wherein said worm wheel is housed in a gear case and the gear case is provided with a first axle for rotatably supporting said second gear, a second axle for rotatably supporting said third gear and a third axle for rotatably supporting said rotor gear, and said first, second and third axles are disposed in parallel to said output shaft.

10. A geared electric motor as set forth in claim 9, wherein said rotation sensor comprises a magnet disposed on said rotor and a signal generating element disposed outwardly of said magnet on the rotor so as not to contact said magnet.

* * * * *